(12) United States Patent
Taylor

(10) Patent No.: US 7,888,916 B1
(45) Date of Patent: Feb. 15, 2011

(54) POWER CONDITIONER FOR CIRCUIT BREAKER PANEL AND METHOD OF USE

(76) Inventor: Gregory G. Taylor, 610 Moonpenny Cir., Port Orange, FL (US) 32127

( * ) Notice: Subject to any disclaimer, the term of this patent is extended or adjusted under 35 U.S.C. 154(b) by 597 days.

(21) Appl. No.: 12/004,953

(22) Filed: Dec. 26, 2007

(51) Int. Cl.
*H02P 15/00* (2006.01)
*H02P 9/00* (2006.01)
*H02J 1/00* (2006.01)

(52) U.S. Cl. .............. 322/100; 322/94; 322/8; 322/12

(58) Field of Classification Search ............... 322/100, 322/75, 94, 7, 8, 12; 307/68
See application file for complete search history.

(56) References Cited

U.S. PATENT DOCUMENTS

| | | | | |
|---|---|---|---|---|
| 1,651,844 A | * | 12/1927 | Spease | 307/86 |
| 1,735,116 A | * | 11/1929 | Jones | 307/58 |
| 2,061,983 A | * | 11/1936 | Rossman | 318/47 |
| 2,297,380 A | * | 9/1942 | Woodworth | 307/140 |
| 2,390,345 A | * | 12/1945 | Bany | 307/87 |
| 3,665,495 A | * | 5/1972 | Carter et al. | 307/67 |
| 4,465,943 A | * | 8/1984 | Risberg | 307/67 |
| 4,827,152 A | * | 5/1989 | Farkas | 307/68 |
| 5,097,194 A | * | 3/1992 | Walton et al. | 320/128 |
| 5,576,613 A |  | 11/1996 | Yang | |
| 6,181,028 B1 | * | 1/2001 | Kern et al. | 307/64 |
| 6,194,794 B1 |  | 2/2001 | Lampe et al. | |
| 6,857,253 B2 |  | 2/2005 | Reimers et al. | |
| 2002/0079853 A1 |  | 6/2002 | Schmitz et al. | |

* cited by examiner

*Primary Examiner*—Julio Gonzalez
(74) *Attorney, Agent, or Firm*—Paul S. Rooy, PA

(57) ABSTRACT

A power conditioner for circuit breaker panel and method of use. The apparatus comprises an electric motor electrically connected to distribution power lines into the breaker panel. The electric motor drives an electric generator. Electric power from the electric generator is fed into sector circuit breaker bus bars in the circuit breaker panel, which in turn power sector circuit breakers mounted to the sector circuit breaker bus bars. The circuit breaker panel may incorporate a main breaker between the distribution power lines and the sector circuit breaker bus bars. The apparatus may include a transmission between the motor and the generator. The method steps include using electric power from the distribution power line to run the electric motor, using the electric motor to drive the generator, and feeding power from the generator to the sector circuit breaker bus bars.

15 Claims, 2 Drawing Sheets

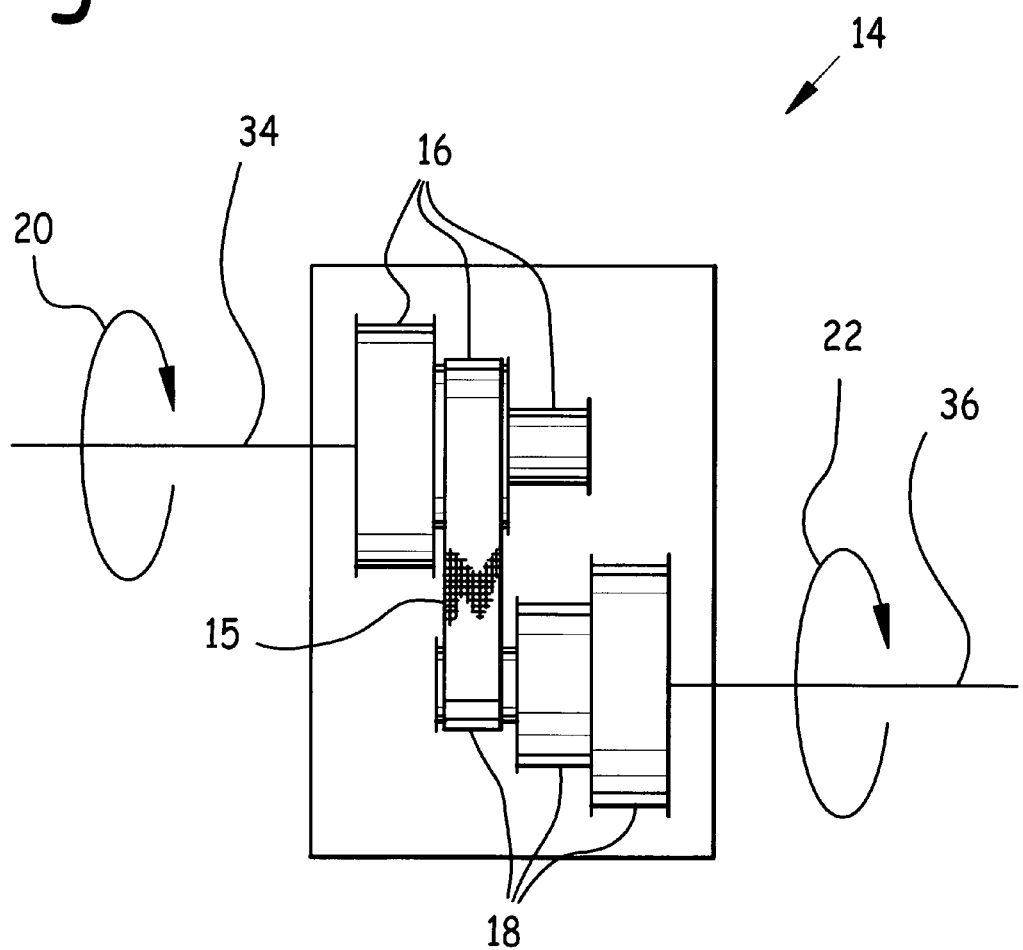

POWER CONDITIONER FOR CIRCUIT BREAKER PANEL AND METHOD OF USE

BACKGROUND OF THE INVENTION

1. Field of the Invention

This invention relates to electric installations, and in particular to a power conditioner for circuit breaker panel and method of use.

2. Background of the Invention

Houses and business typically have a circuit breaker panel at the point where distribution power from the local power distribution system enters the structure. These circuit breaker panels typically incorporate sector circuit breaker bus bars electrically connected to the distribution power lines through a main circuit breaker, and sector circuit breakers electrically connected to each sector circuit breaker bus bar.

It would be desirable to condition the electric power arriving at the sector circuit breaker bus bars.

SUMMARY OF THE INVENTION

Accordingly, it is an object of the present invention to provide a power conditioner for circuit breaker panel which quickly and automatically conditions power received at the sector circuit breakers. Design features allowing this object to be accomplished include an electric motor electrically connected to at least one distribution power line, and an electric generator driven by the electric motor, and power from the generator feeding the sector circuit breaker bus bars. An advantage associated with the accomplishment of this object is conditioned power at the sector circuit breaker bus bars.

It is yet another object of this invention to provide a power conditioner for circuit breaker panel and method of use which is inexpensive to produce and practice. Design features allowing this object to be achieved include the use of components made of readily available materials and commercially available components. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Two sheets of drawings are provided. Sheet one contains FIG. 1. Sheet two contains FIG. 2.

FIG. 2 is a front view of a belt transmission.

DETAILED DESCRIPTION OF THE PREFERRED EMBODIMENT

Figure 1:
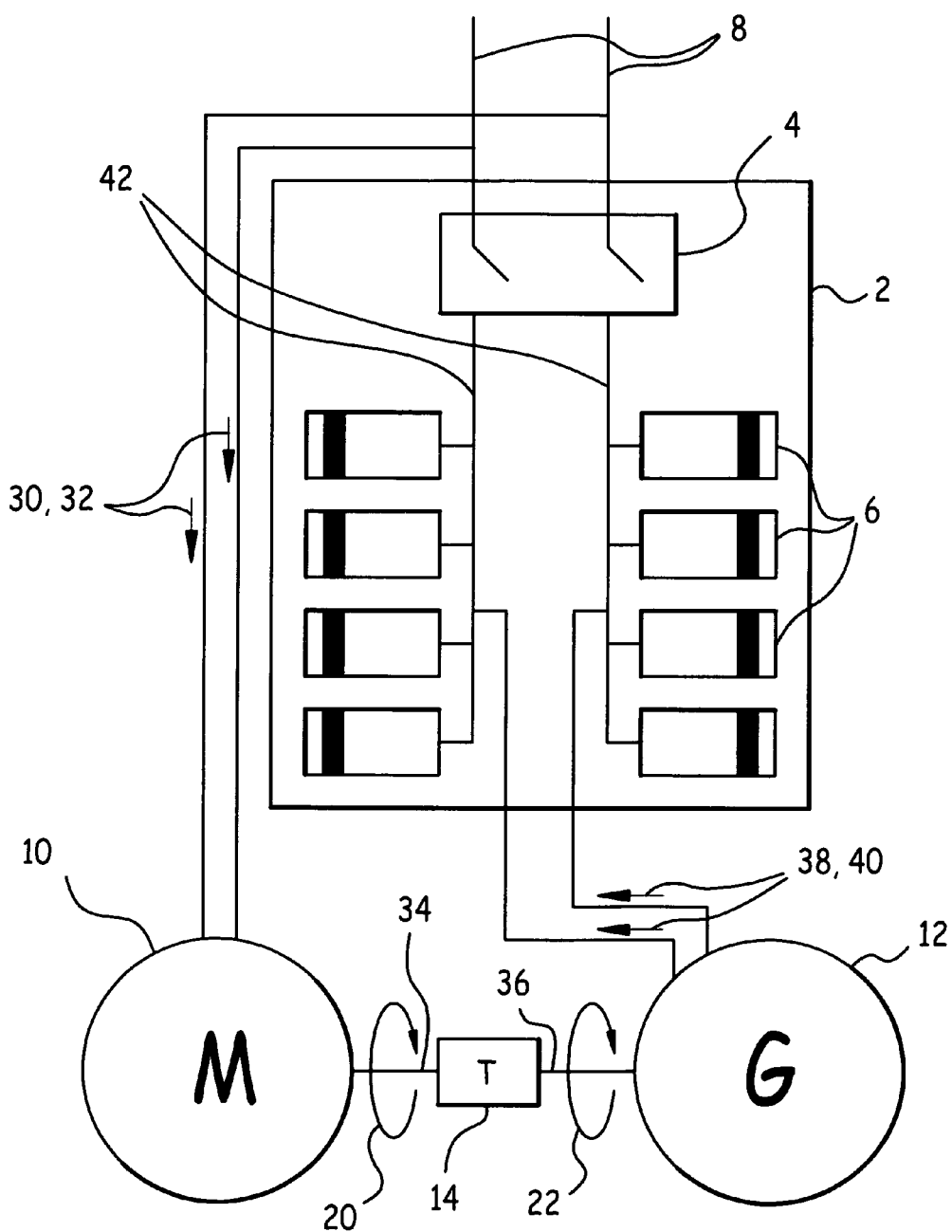
FIG. 1 is a front schematic view of a power conditioner for circuit breaker panel.

FIG. 1 is a front schematic view of a power conditioner for circuit breaker panel. In an existing, prior art circuit breaker panel installation, distribution power lines 8 are connected to sector circuit breaker bus bars 42 through main circuit breaker 4. Sector circuit breakers 6 are electrically connected to, and powered by, sector circuit breaker bus bars 42. Main circuit breaker 4, sector circuit breaker bus bars 42, and sector circuit breakers 6 are disposed within circuit breaker panel 2. In a typical distribution system, distribution power lines 8 may be two 120 volt phases, adding up to 240 volts between the two distribution power lines 8.

The instant invention connects electric motor 10 to distribution power lines 8. Thus, distribution power lines 8 supply electric power to motor 10 via distribution voltage 30 and distribution amperage 32. Electric motor 10 drives electric generator 12 by means of motor rotational motion 34 connected to the output of motor 10, as indicated by arrow 20.

Motor 10 may drive generator 12 directly, or through transmission 14, which may increase or decrease the speed of motor rotational motion 34. If motor 10 drives generator 12 through transmission 14, then generator 12 is driven by transmission rotational motion 36 as indicated by arrow 22.

FIG. 2 is a front view of a transmission 14 which is a belt transmission. In this embodiment, transmission 14 incorporates a plurality of different sized motor spindles 16 driven by motor rotational motion 34 as indicated by arrow 20, and a plurality of generator spindles 18 which provide transmission rotational motion 36 to generator 12 as indicated by arrow 22.

Belt 15 rotationally connects a motor spindle 16 to a generator spindle 18. The specific combination of motor spindle 16 and generator spindle 18 which belt 15 connects (which may be varied) determines the speed of transmission rotational motion 36 which drives generator 12.

The output of generator 12 is electrically connected to sector circuit breaker bus bars 42. In the arrangement depicted in FIG. 1, main circuit breaker 4 may be opened. In this arrangement, sector circuit breaker bus bars 6 are powered solely by generator voltage 38 and generator amperage 40 from generator 12.

Thus, the instant method comprises the steps of:

A. Electrically connecting an electric motor to at least one distribution power line 8;

B. Connecting an electric generator to the output of the electric motor, whereby the motor rotational motion provided by the motor drives the generator;

C. Connecting the output of the electric generator to at least one sector circuit breaker bus bar;

D. Driving the electric generator with motor rotational motion provided by the output of the electric motor; and E. Feeding generator voltage and generator amperage to the at least one sector circuit breaker bus bar, thus providing power to the sector circuit breakers.

The method may include the optional step of opening the main circuit breaker.

In the preferred embodiment, motor 10, transmission 14, generator 12, and the wires connecting motor 10 and generator 12 to distribution power line 8 and sector circuit breaker bus bars 42 were commercially available items. Circuit breaker panel 2 was a commercially available item. Motor 10 was an electric motor powered by electricity, and having a motor output which outputs motor rotational motion 34. Generator 12 was an electric generator having a generator input which takes motor rotational motion 34 from motor 10, or transmission rotational motion 36 from transmission 14, and converts it into electric power comprising generator voltage 38 and generator amperage 40.

While a preferred embodiment of the invention has been illustrated herein, it is to be understood that changes and variations may be made by those skilled in the art without departing from the spirit of the appending claims.

| DRAWING ITEM INDEX | |
| --- | --- |
| 2 | circuit breaker panel |
| 4 | main circuit breaker |
| 6 | sector circuit breakers |

-continued

DRAWING ITEM INDEX

| | |
|---|---|
| 8 | distribution power line |
| 10 | motor |
| 12 | generator |
| 14 | transmission |
| 15 | belt |
| 16 | motor spindle |
| 18 | generator spindle |
| 20 | arrow |
| 22 | arrow |
| 30 | distribution voltage |
| 32 | distribution amperage |
| 34 | motor rotational motion |
| 36 | transmission rotational motion |
| 38 | generator voltage |
| 40 | generator amperage |
| 42 | sector circuit breaker bus bar |

I claim:

1. A power conditioner for circuit breaker panel comprising at least one distribution power line electrically connected to a sector circuit breaker bus bar, at least one sector circuit breaker electrically connected to said a sector circuit breaker bus bar, an electric motor electrically connected to said at least one distribution power line, an electric generator driven by motor rotational motion from an output of said electric motor, output from said generator being directly electrically connected to said at least one sector circuit breaker bus bar, generator output voltage and frequency substantially equaling distribution power line voltage and frequency, whereby said sector circuit breaker bus bar is powered by both said distribution power line and said generator and whereby said sector circuit breaker bus bar is powered simultaneously by said distribution power line and said generator.

2. The power conditioner for circuit breaker panel of claim 1 further comprising a main circuit breaker electrically connected between said at least one distribution power line and said sector circuit breaker bus bar.

3. The power conditioner for circuit breaker panel of claim 1 wherein said main circuit breaker is open.

4. The power conditioner for circuit breaker panel of claim 1 further comprising a transmission mechanically connected to said motor rotational motion, an output from said transmission being mechanically connected to said generator, said motor driving said generator through said transmission by transmission rotational motion out of said transmission.

5. The power conditioner for circuit breaker panel of claim 1 comprising two distribution power lines, each said distribution power line being connected to a respective sector circuit breaker bus bar, said electric motor being connected to said two distribution power lines, the electric output from said generator being electrically connected to the sector circuit breaker bus bars.

6. The power conditioner for circuit breaker panel of claim 5 further comprising a main circuit breaker electrically connected between said distribution power lines and said sector circuit breaker bus bars.

7. The power conditioner for circuit breaker panel of claim 6 wherein said main circuit breaker is open.

8. A power conditioner for circuit breaker panel comprising at least one distribution power line electrically connected to a sector circuit breaker bus bar; at least one sector circuit breaker electrically connected to said a sector circuit breaker bus bar; an electric motor electrically connected to said at least one distribution power line; an electric generator driven by motor rotational motion from an output of said electric motor, output from said generator being electrically connected to said at least one sector circuit breaker bus bar; and a transmission mechanically connected to said motor rotational motion, an output from said transmission being mechanically connected to said generator, said motor driving said generator through said transmission by transmission rotational motion out of said transmission, said transmission comprising a plurality of motor spindles of differing sizes driven by said motor rotational motion, a plurality of generator spindles mechanically connected to an input of said generator, and a belt rotationally connecting one said motor spindle to one said generator spindle.

9. A method of use for a power conditioner for circuit breaker panel comprising the steps of:

A. Providing a circuit breaker panel comprising at least one distribution power line electrically connected to a respective sector circuit breaker bus bar, and at least one sector circuit breaker electrically connected to, and powered by, said sector circuit breaker bus bar;

B. Electrically connecting an electric motor to said at least one distribution power line;

C. Connecting an electric generator to an output of said electric motor, whereby motor rotational motion drives said generator;

D. Directly connecting electric output of said electric generator to said least one sector circuit breaker bus bar;

E. Driving said electric generator with motor rotational motion provided by said output of said electric motor; and F. Feeding generator voltage and generator amperage from said generator to the said sector circuit breaker bus bar, said generator voltage being substantially equal to said distribution power line voltage, generator frequency being substantially equal to power line frequency, whereby electric power is provided to said at least one sector circuit breaker by both said generator and said distribution power line and whereby said sector circuit breaker bus bar is fed with power simultaneously by said distribution power line and said generator.

10. The method of use for a power conditioner for a circuit breaker panel of claim 9 comprising the steps of providing a main circuit breaker electrically connected between said at least one distribution power line and said at least one sector circuit breaker bus bar, and opening said main circuit breaker.

11. The method of use for a power conditioner for a circuit breaker panel of claim 9 comprising the further steps of providing a transmission whose input is mechanically connected to said motor rotational motion, and whose output drives said generator, and using said transmission to control an input speed of said generator.

12. A power conditioner for circuit breaker panel comprising two distribution power lines, each said distribution power line being electrically connected to a respective sector circuit breaker bus bar, at least one sector circuit breaker electrically connected to each said sector circuit breaker bus bar, an electric motor electrically connected to said distribution power lines, an electric generator driven by motor rotational motion from an output of said electric motor, output from said generator being directly electrically connected to said sector circuit breaker bus bars, generator output voltage and frequency substantially equaling distribution power line voltage and frequency, whereby said sector circuit breaker bus bars are powered by both said distribution power line and said generator and whereby said sector circuit breaker bus bar is powered simultaneously by said distribution power line and said generator.

13. The power conditioner for circuit breaker panel of claim 12 further comprising a main circuit breaker electrically connected between said distribution power lines and said sector circuit breaker bus bars.

14. The power conditioner for circuit breaker panel of claim 13 wherein said main circuit breaker is open.

15. The power conditioner for circuit breaker panel of claim 12 further comprising a transmission mechanically connected to said motor rotational motion, an output from said transmission being mechanically connected to said generator, said motor driving said generator through said transmission by transmission rotational motion out of said transmission.

* * * * *